(12) United States Patent
Miyashita

(10) Patent No.: US 7,450,164 B2
(45) Date of Patent: Nov. 11, 2008

(54) DIGITAL CAMERA

(75) Inventor: Mamoru Miyashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1005 days.

(21) Appl. No.: 10/316,028

(22) Filed: Dec. 11, 2002

(65) Prior Publication Data

US 2003/0117503 A1 Jun. 26, 2003

(30) Foreign Application Priority Data

Dec. 19, 2001 (JP) ............... P. 2001-386085

(51) Int. Cl.
 *H04N 5/76* (2006.01)
(52) U.S. Cl. ............................. 348/231.99
(58) Field of Classification Search ........... 348/372, 348/231.1
See application file for complete search history.

(56) References Cited

U.S. PATENT DOCUMENTS

| 6,327,001 | B1 * | 12/2001 | Yamagishi | 348/552 |
| 6,493,828 | B1 * | 12/2002 | Yamaguchi et al. | 713/324 |
| 6,961,087 | B1 * | 11/2005 | Yoshida | 348/231.1 |
| 7,129,984 | B1 * | 10/2006 | Okada et al. | 348/372 |
| 2002/0106199 | A1 * | 8/2002 | Ikeda | 386/120 |
| 2003/0123859 | A1 * | 7/2003 | Ikeda | 386/120 |
| 2003/0142228 | A1 * | 7/2003 | Flach et al. | 348/335 |

FOREIGN PATENT DOCUMENTS

| JP | 10-178615 A | 6/1998 |
| JP | 11-341430 A | 12/1999 |
| JP | 2000-197003 A | 7/2000 |
| JP | 2000-209485 A | 7/2000 |
| JP | 2001-209545 | 8/2001 |
| JP | 2001-292368 A | 10/2001 |

OTHER PUBLICATIONS

Machine Translation of JP A 11-341430 (submitted on IDS).*

* cited by examiner

*Primary Examiner*—Tuan Ho
*Assistant Examiner*—Dillon Durnford-Geszvain
(74) *Attorney, Agent, or Firm*—Sughrue Mion, PLLC

(57) ABSTRACT

Upon the activation of a system, an activation program that at the least is required for activating an image pickup unit is fetched to a buffer memory and is executed to enable photographing. Thus, when a release button is manipulated, image data obtained by the image pickup unit is stored in the buffer memory, and thereafter the remaining activation programs, including a program for obtaining information associated with a memory card, are fetched to the buffer memory and are executed. Since, prior to other processes such as the acquisition of information associated with the memory card, only the process for activating the image pickup unit is performed to quickly activate the system and enable photographing, the time required for activation from when power is switched on until photographing is enabled is shortened, and the probability that a photo opportunity will be lost is reduced considerably.

16 Claims, 4 Drawing Sheets

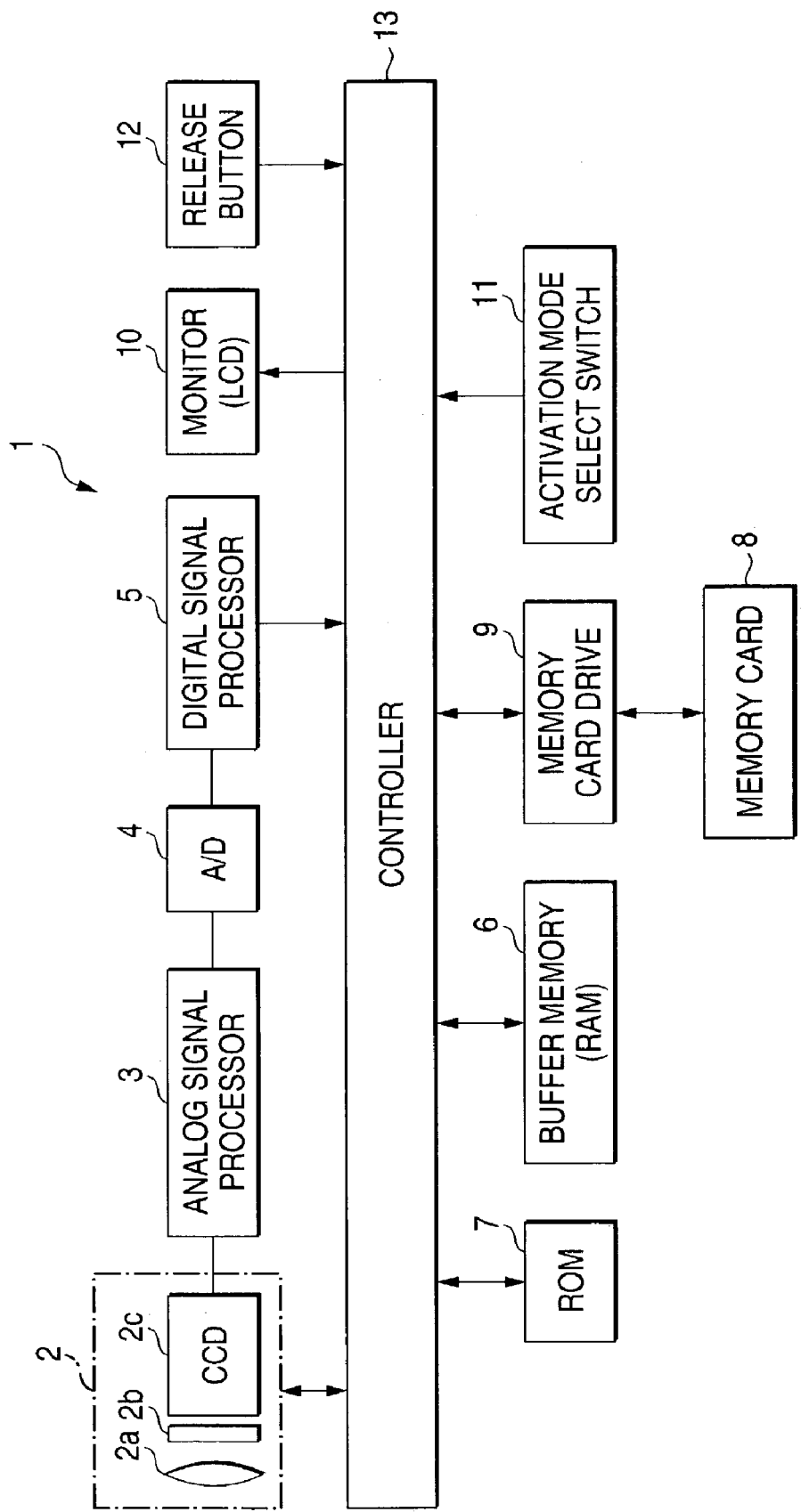

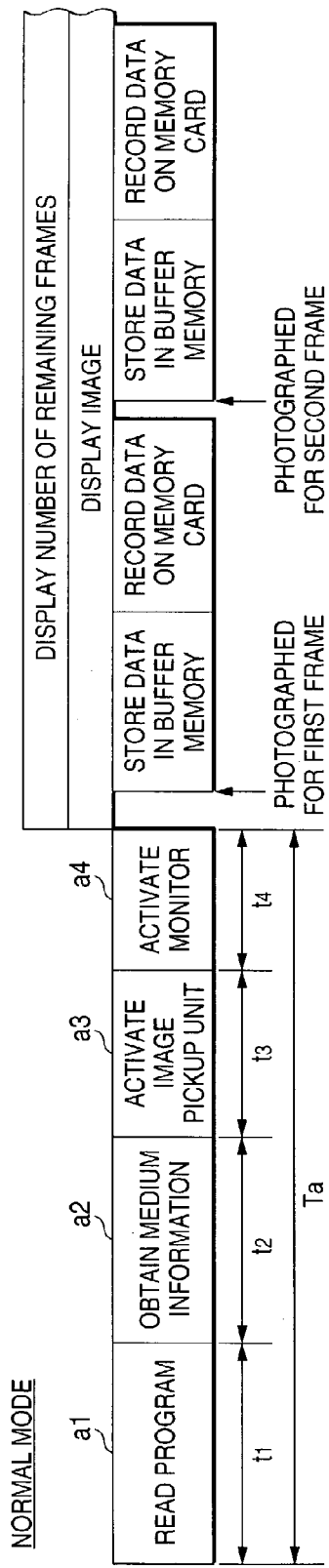
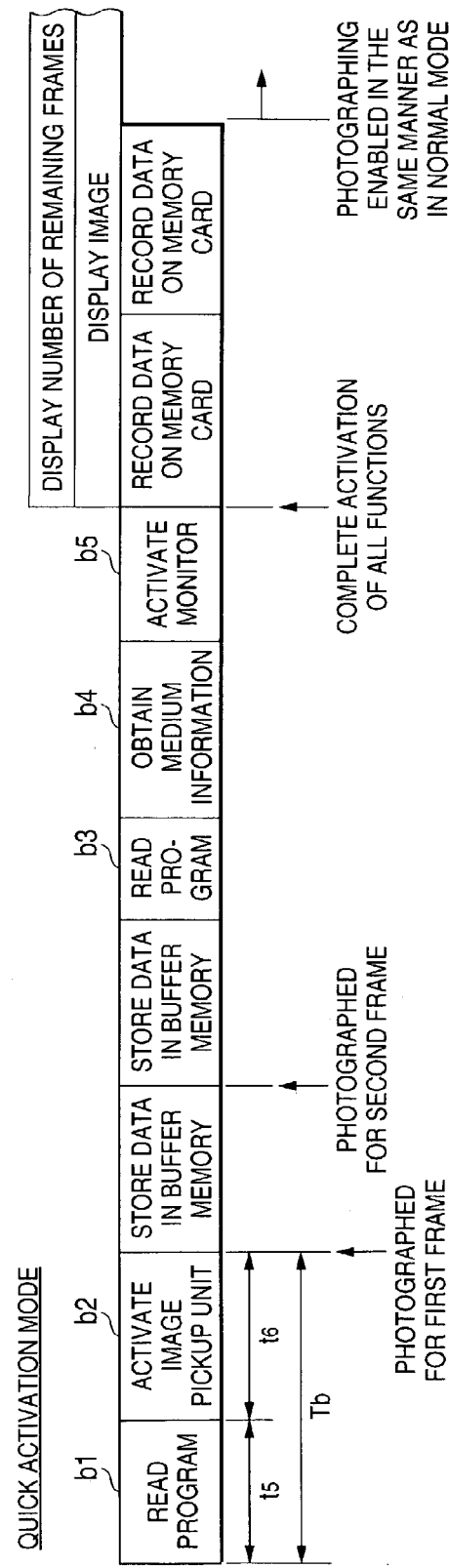

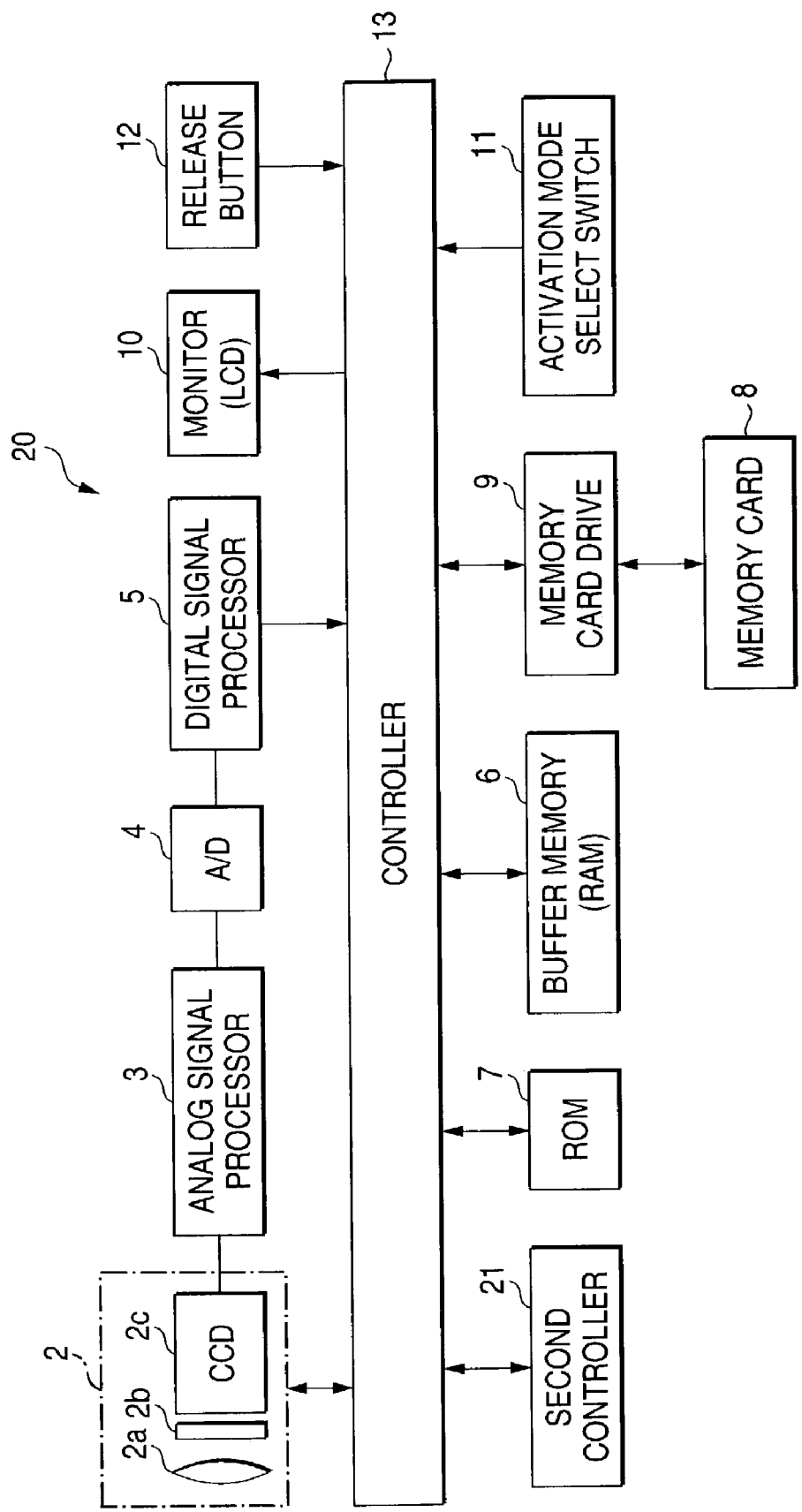

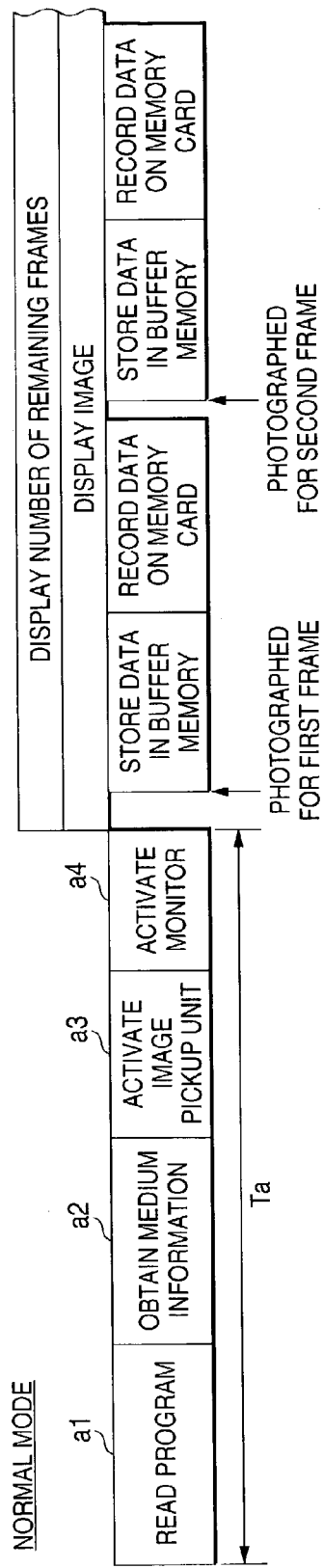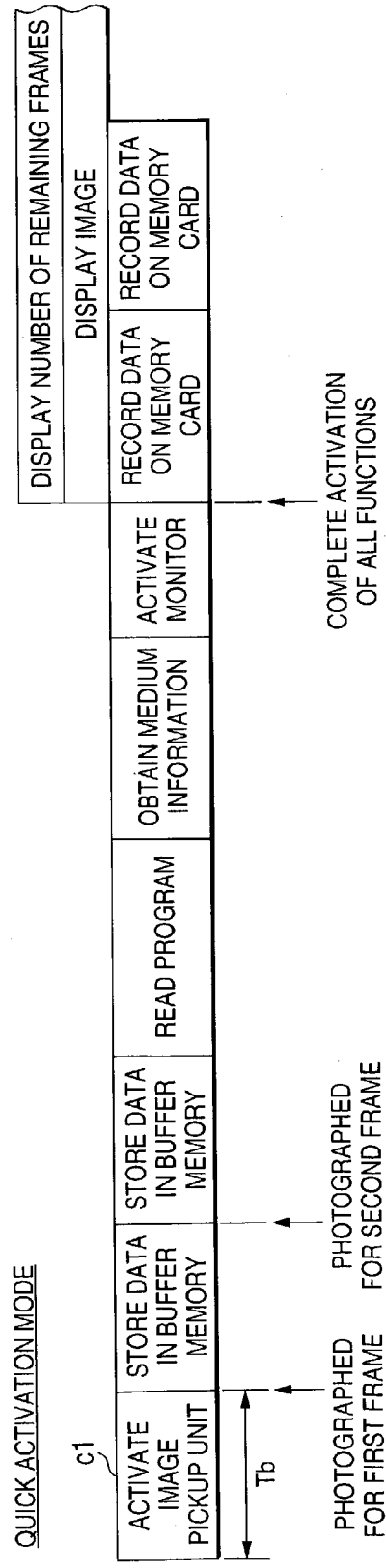

DIGITAL CAMERA

BACKGROUND OF THE INVENTION

The present invention relates to a digital camera, and relates in particular to an activation process performed for a digital camera after it is powered on.

A currently employed digital camera is so designed that after power is switched on, system activation is performed by reading all the programs stored on a ROM to a buffer memory. At this time, following the powering on of the digital camera, since information, such as the format state of a memory card for recording image data or the number of frames remaining (remaining capacity), is obtained and an image-pickup system or a monitor is activated, about three to five seconds elapse before the camera is operational. That is, for about three to five seconds after the power has been switched on, depressing a release button will not result in the taking of a photograph. Therefore, when a digital camera user chances upon a desirable photo opportunity, the user will not be able to take advantage of it if the camera has not already been powered on.

In order to resolve this shortcoming, an example digital camera is proposed in Japanese Patent Publication No. 2001-209545. With this example camera, for the process performed upon the activation of the system, the fewest possible programs, including a mode determination program for determining an operating mode, such as an auto photographic mode, a manual photographic mode, a self-timed photographic mode, a reproduction mode or a setting mode, are fetched and executed, then only a required program for the operating mode determined by the mode determination program is fetched and executed.

According to the digital camera disclosed in Japanese Patent Publication No. 2001-209545, since the number of programs to be read is smaller than in the case wherein all the programs are read and executed upon the activation of the system, the time required, from the switching on of the power until photographing is enabled, can be reduced. However, in this example, in each operating mode determined by the mode determination program, the image-pickup system is activated after information associated with the memory card is obtained. Therefore, the image-pickup system is not activated until the acquisition of information associated with the memory card has been completed.

The longest time required is for the process, one of those required for the activation of the system, performed to obtain the information associated with the memory card. Therefore, according to the method for activating the image-pickup system following the completion of this process, some activation time is still required, from the time the power is switched on until photographing is enabled, especially when a memory card having a large capacity is employed.

SUMMARY OF THE INVENTION

To resolve the above-mentioned problems, it is one object of the present invention to provide a digital camera that can reduce, to the extent possible, the activation time required from the switching on of power for the system to the enabling of the photographing.

According to the present invention, a digital camera Includes an image pickup unit for employing an image pickup element to obtain an object image, a buffer memory for temporarily storing image data obtained by the image pickup unit; a recording medium for storing the image data received from the buffer memory, and activation control means for, upon the activation of the system, executing an activation program that, at the least, is required to activate the image pickup unit in order to enable photographing, and for storing in the buffer memory image data obtained by a photographic operation and for executing the remaining activation programs, including a program for obtaining information associated with the recording medium.

Further, when power is on, the activation control means reads, to a program storage area in the buffer memory, a program that at the least is required for activating the image pickup unit, and executes the program to enable photographing; reads, to the program storage area in the buffer memory, the remaining activation programs, including a program for obtaining information associated with the recording medium, and executes the activation programs; and, when a photographing start operator is manipulated, stores, to the extent possible, the image data, which is obtained by the image pickup unit, to an image data storage area in the buffer memory.

Furthermore, when the photographing start operator is manipulated in the power-OFF state, the activation control means executes the activation program, at least to the extent required for the activation of the image pickup unit, and performs system activation.

When the activation operation is completed by executing the remaining activation programs, including the program for obtaining information associated with the recording medium, the activation control means transmits to the recording medium the image data stored in the buffer memory.

Upon the activation of the system, the thus arranged digital camera of the invention executes a program that, at the least, is required to activate the image pickup unit and to enable the photographic process, and when the photographic process is performed, stores the obtained image data, to the extent possible, in the buffer memory, i.e., until the image data area is filled. After the photographic process is enabled, the remaining programs related to system activation, i.e., a program for obtaining information associated with the recording medium and a program for activating a monitor and a mode determination program, are executed. As is described above, since prior to the processes for obtaining information associated with the recording medium and for activating the monitor, the process for activating the image pickup unit is executed to enable photographing, the activation time, extending from when the power is switched on until the photographing is enabled, is reduced.

When the digital camera is so designed that the system is activated upon the manipulation of the photographic process start operator in the power-OFF state, the image pickup unit can be activated by manipulating the photographic process start operator, and the photographic process can be started immediately.

Since, following the completion of the activation, the image data in the buffer memory are transmitted to the recording medium and are recorded therein, the image data obtained immediately after the power is switched on can be stored in the same manner as during the normal photographic process. Further, when image data recorded on the recording medium is abandoned, a storage area for newly obtained image data can be obtained.

BRIEF DESCRIPTION OF THE DRAWINGS

FIG. 1 is a diagram showing the system configuration for a digital camera according to a first embodiment of the present invention;

FIG. 2A is a diagram for explaining the system activation processing performed by the digital camera in FIG. 1 in the normal mode according to the first embodiment;

FIG. 2B is a diagram for explaining the system activation processing performed by the digital camera in FIG. 1 in the quick activation mode according to the first embodiment;

FIG. 3 is a diagram showing the system configuration for a second embodiment of the present invention;

FIG. 4A is a diagram for explaining the system activation processing performed by the digital camera of the second embodiment shown in FIG. 3 in the normal mode; and FIG. 4B is a diagram for explaining the system activation processing performed by the digital camera of second embodiment shown in FIG. 3 in the quick activation mode.

DETAILED DESCRIPTION OF THE PREFERRED EMBODIMENT

The preferred embodiment of the present invention will now be described with reference to the drawings.

Embodiment 1

FIG. 1 is a diagram showing the system configuration of a digital camera according to a first embodiment of the present invention.

A digital camera 1 includes an image pickup unit 2, an analog signal processor 3, an A/D converter 4, a digital signal processor 5, a buffer memory 6, a ROM 7, a memory card 8, a memory card drive 9, a monitor 10, an activation mode select switch 11, a release button 12 and a controller 13.

The image pickup unit 2 includes a lens 2a, a shutter 2b and a CCD (image pickup element) 2c. The lens 2a is used to form an object image on the acceptance surface of the CCD 2c. The shutter 2b is operated at a set shutter speed upon the depression of the release button 12, and the acceptance surface of the CCD 2c is exposed. The CCD 2c accumulates a charge corresponding to the amount of incident light, and transmits the accumulated charge and outputs an electric signal, i.e., an image signal, to the analog signal processor 3. It should be noted that instead of the mechanical shutter 2b, an electronic shutter may be provided for the CCD 2c.

The analog signal processor 3 performs predetermined analog signal processing (e.g., noise reduction processing) for an input image signal, and outputs the obtained signal to the A/D converter 4. At the A/D converter 4, the analog signal is converted into a digital signal that is output to the digital signal processor 5. The digital signal processor 5 performs predetermined digital signal processing (e.g., shading correction processing) for the digital signal that is input, and outputs the obtained signal to the controller 13.

A volatile or nonvolatile fast writable RAM is employed as the buffer memory 6. The memory area of the buffer memory 6 is employed as a program area and an image data area, and system activation programs and image data obtained by the image pickup system 2 are stored therein. The capacity of the buffer memory 6 is generally determined in accordance with the number of pixels provided for the CCD 2c mounted in the digital camera 1. For a two million pixel model, a buffer memory 6 of 8 Mb (bytes) is employed, and for a three million pixel model, a buffer memory of 16 Mb is employed. In this embodiment, the capacity of the buffer memory 6 is 8 Mb, and of this, 2 Mb is used for storing programs while the remaining 6 Mb is used for storing image data. An operation control program for implementing the various functions of the digital camera 1 is stored in the ROM 7.

The memory card 8, which is an image data recording medium, is an auxiliary storage device using either card or stick type flash memory. The memory card 8 has a large capacity, such as 64 Mb, 128 Mb or 256 Mb. The memory card drive 9 has a mounting slot, into which the memory card 8 is inserted, and a data communication interface that writes image and other data to, or reads them from, the memory card 8.

The monitor 10 functions as a finder for displaying an image that is being photographed by the CCD 2c, and as a reproduction display device for displaying an image recorded on the memory card 8. An LCD (Liquid Crystal Display) device is employed as the monitor 10.

The activation mode select switch 11 is used to set a mode for activating the digital camera 1 either in the normal mode or a quick activation mode, which will be described later. Further, rather than the activation mode select switch 11 being provided, the digital camera 1 may instead be activated, and remain, in the quick activation mode.

The release button 12 is an operating member (a photographing start operator) that controls the operation of the shutter 2b. And by interacting with the depression of the release button 12, a one-state or multi-state switch (not shown) is turned on and transmits a release signal to the controller 13. In this embodiment, the release button 12 is also used as a switch for turning on the power in the quick activation mode. When the release button 12 is depressed in the power-OFF state and is not released for at least a predetermined period of time, the digital camera 1 is powered on and is activated in the quick activation mode.

The controller 13 is constituted by a processor, such as an MPU or a DSP, that provides overall control for the digital camera 1 and performs image signal processing by executing a program stored in the ROM 7. The controller 13 also serves as the activation control means. Upon the activation of the system, the controller 13 reads an activation program from the ROM 7 and loads the program into the buffer memory 6, and then performs the activation process in accordance with the program.

The operation of the thus arranged digital camera 1 will now be described. When a power switch (not shown) is turned on, first, the digital camera 1 examines the state set by the activation mode select switch 11, and in accordance with the state, activates the system in either the normal mode or the quick activation mode. Further, when the release button 12 is depressed and held for at least a predetermined period of time, the system is activated in the quick activation mode.

FIGS. 2A and 2B are diagrams showing the system activation processing according to the embodiment that is performed by the digital camera 1; the processing in the normal mode is shown in FIG. 2A, and the processing in the quick activation mode is shown in FIG. 2B.

Upon the activation of the system in the normal mode, all the activation programs are read from the ROM 7 and are loaded into the buffer memory 6 (a1). Then, the medium information acquisition process (a2) is performed to obtain information such as the number of frames remaining in the memory card 8. Thereafter, the process for activating the image pickup unit 2 (a3) and the process for activating the monitor 10 (a4) are sequentially performed, and operating information, including the number of frames remaining in the memory card 8, is displayed on the monitor 10 along with an image that is being photographed by the CCD 2c. Finally, the automatic exposure (AE) operation and the autofocus (AF) operation are turned on and photographing is enabled.

Each time the release button 12 is depressed, the image pickup process is performed by the CCD 2c. The image data for the photographed object are temporarily stored in the buffer memory 6, and thereafter, the compression ratio for the image data and the resolution (the number of pixels) are changed and the compressed image data are transmitted to and recorded on the memory card 8.

Upon the activation of the system in the quick activation mode, first, part of the activation programs, i.e., a program required for the activation of the image pickup unit 2, is read from the ROM 7 and is loaded into the buffer memory 6 (b1). Then, the process for activating the image pickup unit 2 (b2) is performed, and after this process has been completed, photographing is enabled.

The photographic conditions at this time, such as the exposure value, the shutter speed and the focal distance, are fixed values set by referring to values established at the design stage, values specifically set by a user, or the values that were set and used to take the preceding photograph.

When the process (b2) for activating the image pickup unit 2 in the quick activation mode has been completed and when the release button 12 is depressed, at the same time or thereafter, the image pickup of data for the first frame is immediately performed, and the obtained raw image data, i.e., the full sized image data, which have not been compressed, are stored in the buffer memory 6. Then, when the release button 12 is depressed again after the image pickup for the first frame has been completed, image pickup for the second frame is performed and the obtained raw image data is stored in the buffer memory 6.

Since the amount of data obtained for one image by a 200 pixel CCD is about 2 Mb, in this embodiment, raw image data for a maximum of three frames can be stored in the 6 Mb image data storage area of the buffer memory 6. Thus, when there lease button 12 continues to be depressed after the image pickup for the second frame has been completed, the image pickup is continued for the third frame, and the obtained raw image data is stored in the buffer memory 6. In FIG. 2B, image pickup has been completed up to the second frame.

Thereafter, the remaining programs associated with system activation are read from the ROM 7 and are loaded into the buffer memory 6 (b3). Following this, the medium information acquisition process (b4) and the monitor 10 activation process (b5) are sequentially performed, and operating information, such as the number of remaining frames for the memory card 8, is displayed on the monitor 10 along with the image that is currently being photographed by the CCD 2c. Thus, full activation of all the functions available in the normal mode is completed, and the automatic exposure (AE) operation and the autofocus (AF) operation are turned on and normal photographing is enabled.

When the release button 12 is not depressed at this time, the image data in the buffer memory are compressed, beginning with the first frame, and the compressed image data are transmitted to and recorded on the memory card 8. The area whereat the transferred image data were stored can then be used to store newly obtained image data. So when the release button 12 is depressed, image data obtained by the image pickup unit 2 are temporarily stored in the free area and compressed, and the compressed image data are transmitted to and recorded on the memory card 8. If the release button 12 is depressed during the transfer of image data and no free space is available in the buffer memory 6, the release instruction is not accepted.

When about one second each is required for time t1, for the process (a1) for reading and loading all the activation programs, and for time t2, for the medium information acquisition process (a2), and about 0.5 seconds each is required for time t3, for the process (a3) for activating the image pickup unit 2, and for time t4, for the process (a4) for activating the monitor 10, as activation time Ta in the normal mode about three seconds are required from the time the power is switched on until photographing is enabled.

Whereas, when about 0.5 seconds each is required for time t5, for the process (b1) for reading and loading the program that, at the least, is required for the activation of the image pickup unit 2, and for time t6, for the process (b2) for activating the image pickup unit 2, as activation time Tb in the quick activation mode only about one second is sufficient, since the power is switched on until photographing is enabled.

As is described above, according to the embodiment, before the program is read to obtain the information associated with the memory card 8 or to activate the monitor 10, the program required to activate the image pickup unit 2 is read and executed to enable photographing. Therefore, the time required for activation, from when the power is switched on until photographing is enabled, can be reduced without changing the hardware configuration of the digital camera 1. Especially for a large capacity memory card for which time is required to obtain information associated with the card, this invention is more effective and can reduce the activation time. Further, when in the power-OFF state the release button 12 is depressed and held, the digital camera 1 can be quickly activated so as to immediately enable photographing. Therefore, the possibility that a photo opportunity will be lost can be considerably reduced.

Embodiment 2

FIG. 3 is a diagram showing a system configuration of the digital camera according to the second embodiment of the present invention.

According to this embodiment, a digital camera 20 has a second controller 21 that includes a processor (microcomputer) incorporating a program required for activating the image pickup unit 2. Since the remainder of the configuration is the same as that for the digital camera 1 of the first embodiment shown in FIG. 1, the same reference numerals are employed to denote the corresponding components and no further explanation for them will be given.

FIG. 4 is a diagram showing the system activation processing performed by the digital camera 20 of the second embodiment. The processing in the normal mode is shown in FIG. 4A and the processing in the quick activation mode is shown in FIG. 4B. The system activation processing in the normal mode in FIG. 4A is the same as that in FIG. 2A.

In the quick activation mode in FIG. 4B, the digital camera 20 is activated by a program stored in the second controller 21, and the process (c1) for activating the image pickup unit 2 is started, and when this process has been completed photographing is enabled. The processing thereafter is the same as that in FIG. 2B. In this case, when about 0.5 seconds is required for the process (c1) for activating the image pickup unit 2, as the activation time Tb in the quick activation mode only about 0.5 seconds is required since the power is switched on until photographing is enabled. Therefore, according to this modification, a faster activation can be implemented, and the probability that a photo opportunity will be lost can be even more reduced.

In the operation for the above embodiments of the invention, the activation mode select switch 11 is employed to select either the normal mode or the quick activation mode. However, by turning on a power switch or by depressing and holding the release button 12, the system may generally be activated in the quick activation mode.

Further, according to the above embodiments, the raw image data obtained in the quick activation mode is stored in the buffer memory 6, and image data obtained thereafter by compression is transmitted to and recorded on the memory card 8. However, the resolution and the compression ratio for the image data obtained in the quick activation mode may be set in advance, and the image data obtained through compression may be stored in the buffer memory 6.

Upon the activation of the system in the quick activation mode, the image pickup unit 2 may be always activated using a fixed shutter speed and exposure value. Further, the activation mode may be selected on the monitor 10 by using manipulation means such as a cross key.

As is described above, according to the embodiments of the invention, upon the activation of the system, only the program required for the activation of the image pickup unit is read and executed to enable photographing, and thereafter, programs for obtaining information associated with a recording medium and for activating a monitor are read and executed to complete the activation process. With this configuration, the time required for the activation period, from when power is switched on until photographing is enabled, can be reduced as much as possible, and photographing is enabled momentarily from the power-OFF state, the probability that a photo opportunity will be lost can be reduced considerably.

As is described above, according to the embodiments of the invention, a digital camera can be provided for which the time required for the system activation period, from when power is switched on until photographing is enabled, is reduced as much as possible.

What is claimed is:

1. A digital camera comprising:
   an image pickup unit having an image pickup element to obtain an object image;
   a buffer memory for temporarily storing image data obtained by said image pickup unit;
   a recording medium for storing the image data received from said buffer memory; and
   an activation control unit which executes a minimum activation program required to activate said image pickup unit to enable photographing on the activation of the image pickup unit, which stores image data obtained by a photographic operation in said buffer memory, and which executes the remaining activation programs to turn on the remaining functions of the camera, including a program for turning on said recording medium,
   wherein the remaining activation programs are executed after the execution of the activation program minimum has begun; and
   wherein the image pickup element is enabled to obtain an image before the activation control unit executes the remaining activation programs.

2. The digital camera as claimed in claim 1,
   wherein said activation control unit reads a minimum program required for activating said image pickup unit into a program storage area in said buffer memory and executes the program to enable photographing when power is on, then, reads the remaining activation programs including a program for obtaining information associated with said recording medium into the program storage area in said buffer memory and executes the remaining activation programs,
   wherein said activation control unit stores, to the extent possible, said image data obtained by said image pickup unit into an image data storage area in said buffer memory when a photographing start operator is manipulated before the execution of the remaining activation programs is completed.

3. The digital camera as claimed in claim 1, wherein said activation control means executes said minimum activation program required for the activation of said image pickup unit and performs system activation when a photographing start operator is manipulated in the power-off state.

4. The digital camera as claimed in claim 1, wherein said activation control unit transmits the image data stored in said buffer memory to said recording medium when the activation operation is completed by executing the remaining activation programs including the program for obtaining information associated with said recording medium.

5. The digital camera as claimed in claim 1, wherein the activation control unit preliminarily activates the image pickup unit and stores image data into the buffer memory as the minimum program prior to executing the remaining activation programs.

6. The digital camera as claimed in claim 5, wherein the remaining activation programs include information for activating the recording medium.

7. The digital camera of claim 1, wherein the image data is stored in the buffer until after the remaining activation programs are completed.

8. A digital camera comprising:
   an image pickup unit having an image pickup element to obtain an object image;
   a buffer memory for temporarily storing image data obtained by said image pickup unit;
   a recording medium for storing the image data received from said buffer memory; and
   a means for executing a minimum activation program that performs the minimum operations required to activate the image pickup unit, for storing image data obtained by the image pickup unit in the buffer memory, and for executing remaining activation programs including a program for turning on the recording medium,
   wherein the means preliminarily activates the image pickup unit and stores image data into the buffer memory as the minimum activation program prior to executing the remaining activation programs,
   wherein the remaining activation programs are executed after the execution of the activation program minimum has begun.

9. The digital camera as claimed in claim 8, wherein the remaining activation programs include information for activating the recording medium.

10. A digital camera comprising:
    an image pickup unit having an image pickup element to obtain an object image;
    a buffer memory for temporarily storing image data obtained by said image pickup unit;
    a recording medium for storing the image data received from said buffer memory; and
    an activation control unit which executes an activation program minimum required to activate said image pickup unit to enable photographing on the activation of the image pickup unit, which stores image data obtained by a photographic operation in said buffer memory, and which executes the remaining activation programs including a program for obtaining information associated with said recording medium,
    wherein the remaining activation programs are read and executed after image data for at least one frame is stored in the buffer memory.

11. A digital camera comprising:
an image pickup unit having an image pickup element to obtain an object image;
a buffer memory for temporarily storing image data obtained by said image pickup unit;
a recording medium for storing the image data received from said buffer memory; and
a means for executing a minimum activation program required to activate the image pickup unit, for storing image data obtained by the image pickup unit in the buffer memory, and for executing remaining activation programs including a program for obtaining information associated with the recording medium,
wherein the means preliminarily activates the image pickup unit and stores image data into the buffer memory as the minimum activation program prior to executing the remaining activation programs,
wherein the remaining activation programs are read and executed after image data for at least one frame is stored in the buffer memory.

12. A digital camera comprising:
an image pickup unit having an image pickup element to obtain an object image;
a buffer memory for temporarily storing image data obtained by said image pickup unit;
a recording medium for storing the image data received from said buffer memory; and
an activation control unit which executes an activation program minimum required to activate said image pickup unit to enable photographing on the activation of the image pickup unit, which stores image data obtained by a photographic operation in said buffer memory, and which executes the remaining activation programs including a program for obtaining information associated with said recording medium,
wherein the remaining activation programs include a program to activate a monitor.

13. A digital camera comprising:
an image pickup unit having an image pickup element to obtain an object image;
a buffer memory for temporarily storing image data obtained by said image pickup unit;
a recording medium for storing the image data received from said buffer memory; and
a means for executing a minimum activation program required to activate the image pickup unit, for storing image data obtained by the image pickup unit in the buffer memory, and for executing remaining activation programs including a program for obtaining information associated with the recording medium,
wherein the means preliminarily activates the image pickup unit and stores image data into the buffer memory as the minimum activation program prior to executing the remaining activation programs,
wherein the remaining activation programs include a program to activate a monitor.

14. A digital camera comprising:
an image pickup unit having an image pickup element to obtain an object image;
a buffer memory for temporarily storing image data obtained by said image pickup unit;
a recording medium for storing the image data received from said buffer memory; and
an activation control unit which executes a minimum activation program that performs only the operations required to activate said image pickup unit to enable photographing to the buffer memory on the activation of the image pickup unit, which stores image data obtained by a photographic operation in said buffer memory, and which executes the remaining activation programs to turn on the remaining functions of the camera, including a program for obtaining information associated with said recording medium,
wherein the remaining activation programs are executed after the execution of the activation program minimum has begun.

15. A digital camera comprising:
an image pickup unit having an image pickup element to obtain an object image;
a buffer memory for temporarily storing image data obtained by said image pickup unit;
a recording medium for storing the image data received from said buffer memory; and
an activation control unit which executes an minimum activation program that performs the minimum operations required to activate said image pickup unit to enable photographing on the activation of the image pickup unit, and which does not power on the recording medium, which stores image data obtained by a photographic operation in said buffer memory, and which executes the remaining activation programs including a program for obtaining information associated with said recording medium,
wherein the remaining activation programs are executed after the execution of the activation program minimum has begun.

16. A digital camera comprising:
an image pickup unit having an image pickup element to obtain an object image;
a buffer memory for temporarily storing image data obtained by said image pickup unit;
a recording medium for storing the image data received from said buffer memory; and
an activation control unit which executes a minimum activation program required to activate said image pickup unit to enable photographing on the activation of the image pickup unit, which stores image data obtained by a photographic operation in said buffer memory, and which executes the remaining activation programs to power on the remaining functions of the camera, including a program for powering on said recording medium,
wherein the remaining activation programs are executed after the execution of the activation program minimum has begun.

* * * * *